Figure 1:
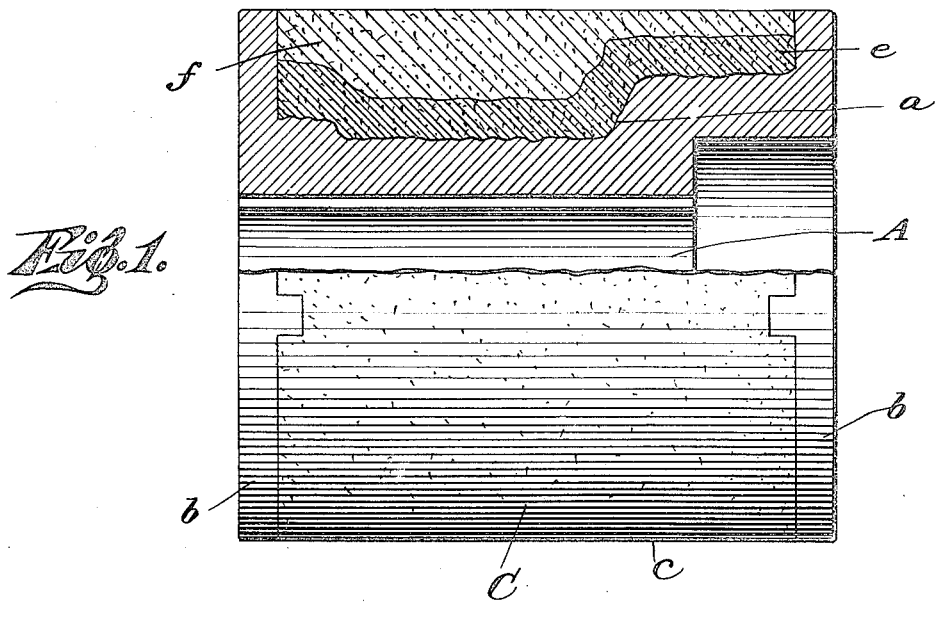

March 25, 1924.

I. N. JOHNSTON

PULLEY

Filed Jan. 17, 1923

1,487,945

INVENTOR,
Isaac N. Johnston
BY
Blakeslee & Brown
ATTORNEYS.

Patented Mar. 25, 1924.

1,487,945

UNITED STATES PATENT OFFICE.

ISAAC N. JOHNSTON, OF LOS ANGELES, CALIFORNIA.

PULLEY.

Application filed January 17, 1923. Serial No. 613,134.

*To all whom it may concern:*

Be it known that I, ISAAC N. JOHNSTON, a citizen of the United States, residing at Los Angeles, in the county of Los Angeles and State of California, have invented new and useful Improvements in Pulleys, of which the following is a specification.

This invention relates to pulleys, and particularly to power transmission pulleys, and has for an object to provide an improved pulley of this character which will be superior in general efficiency and serviceability, durability, and capability of effective and sure power transmission, with the elimination of "slip".

The invention consists in the novel and useful provision, formation, association, relative arrangement and combination of parts, members and features, all as hereinafter described, shown in the drawing, and finally pointed out in claims.

Figure 2:
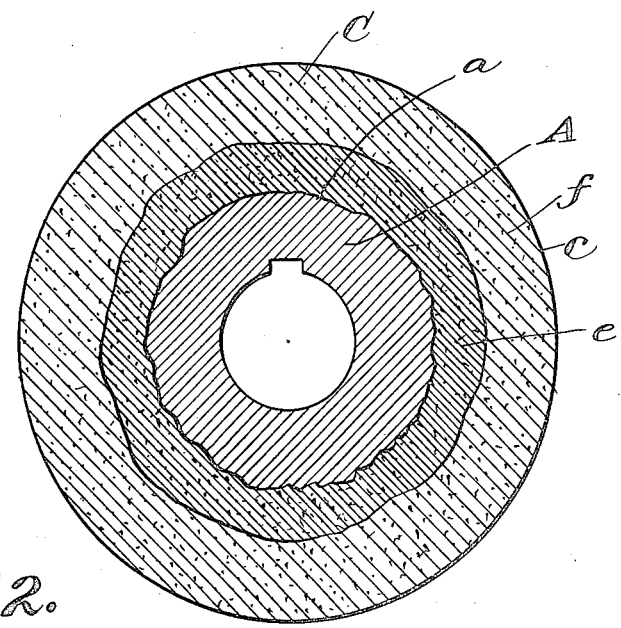

In the drawing:

Figure 1 is a face view, partly in radial section and partly broken away, of a pulley constructed to embody the invention; and, Figure 2 is a transverse sectional view of the same.

Corresponding parts in both figures are designated by the same reference characters.

Referring with particularity to the drawing, I have shown at A a core, preferably metallic, such as cast iron, having a pronouncedly roughened or uneven periphery or surface portion $a$, and having end flanges $b$, together with a body and surface member C massed between the flanges $b$ and over the core A and its rough surface $a$, so as to provide a true or cylindrical surface $c$ for engagement by and with the transmission belt (not shown). This material preferably consists of vulcanized rubber or rubber composition, and the same is preferably vulcanized to different hardnesses, namely, to an excessive hardness directly next the roughened surface $a$ of the core, and for a material thickness outwardly from same, as at $e$, and of a lesser hardness exteriorly of same, as at $f$. Of course other compositions may be employed in substitution for the stated material of the body and surface member C, but I find that a body of rubber or rubber composition vulcanized to the roughened core produces a highly satisfactory pulley structure. The inter-engaging roughnesses as at $a$ and material C, provide a firm and effective and positive interlocking relation between the core and such body and surface member C, prevents any displacement of such member C upon the core, the core and such member being peripheral and positively held together in a rigid relation and as effectively as if of unitary construction. Of course the roughened surface $a$ may consist of depressions, projections or other forms or conformations not in accordance with the particular showing of the drawing or disclosure of the previous description, all within obvious modification and selection and in accordance with choice and particular nature of service for the pulley. These modifications are not illustrated because of their obviousness and their equivalence to the form and structure shown.

The finished pulley is strong and durable and has long life and will effectively transmit power to a belt passing over it, the hard rubber surface clinging to the belt with sufficient tenacity to prevent any slip as between the belt and the pulley, and thus positively transmit power, and at the same time permitting quick freedom or release of the belt from the pulley surface $c$ in the travel of the belt.

It is obvious that many changes and variations may be made in practicing the invention, in departure from the foregoing disclosure and the drawing, without departing from the true spirit of the invention.

Having thus disclosed my invention, I claim and desire to secure by Letters Patent:

1. A speed transmission pulley provided with end flanges and a surface and body material massed between the flanges and interlocked with the core and consisting of vulcanized rubber vulcanized harder adjacent the core than at its exterior portion.

2. A transmission pulley, comprising a core and a body and surface material applied to the core and consisting of vulcanized rubber interlocked with the core; the portion of the body next adjacent the core being vulcanized harder than at the surface of said body.

In testimony whereof, I have signed my name to this specification in the presence of two subscribing witnesses.

ISAAC N. JOHNSTON.

Witnesses:
 J. SHUTT,
 EDNA TURNER.